(12) United States Patent
Suyehira

(10) Patent No.: US 7,057,761 B2
(45) Date of Patent: Jun. 6, 2006

(54) SYSTEMS AND METHODS FOR ACTIVATING CONFIDENTIAL PRINT JOBS FROM A REMOTE ELECTRONIC DEVICE

(75) Inventor: Richard Suyehira, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 73 days.

(21) Appl. No.: 10/967,415

(22) Filed: Oct. 18, 2004

(65) Prior Publication Data
US 2005/0094184 A1 May 5, 2005

Related U.S. Application Data

(62) Division of application No. 09/667,361, filed on Sep. 21, 2000, now Pat. No. 6,806,976.

(51) Int. Cl.
G06F 13/00 (2006.01)
G06F 15/00 (2006.01)

(52) U.S. Cl. .................................. 358/1.15; 358/1.14
(58) Field of Classification Search ............... 358/1.15, 358/1.14
See application file for complete search history.

(56) References Cited

U.S. PATENT DOCUMENTS 5,956,471 A * 9/1999 Ueda et al. ................. 358/1.14
5,970,218 A * 10/1999 Mullin et al. ............... 358/1.15
6,748,471 B1 * 6/2004 Keeney et al. ............... 710/220

* cited by examiner

Primary Examiner—Douglas Q. Tran
Assistant Examiner—Alan Rahimi

(57) ABSTRACT

Systems and method for activating a confidential print job from a remote device. A printer receives a print job containing personal and/or confidential information together with an indication for the printer to hold, or defer, the print job until an activation command is received. The print job is not printed until the owner of the information transmits an activation command from a remote, portable electronic device. This insures that the owner of the information is present at the printer when the print job is printer. The owner of the information is thus assured that no person other than the owner will receive the information.

8 Claims, 3 Drawing Sheets

SYSTEMS AND METHODS FOR ACTIVATING CONFIDENTIAL PRINT JOBS FROM A REMOTE ELECTRONIC DEVICE

CROSS-REFERENCE TO RELATED APPLICATIONS

This is a division of U.S. patent application Ser. No. 09/667,361 filed Sep. 21, 2000, now U.S. Pat. No. 6,806,976 which is hereby incorporated by reference.

TECHNICAL FIELD

The systems and methods for activating print jobs from a remote electronic device described herein relate to remote control of printing task. More specifically, the described implementations relate to activating confidential print jobs on a printer from a remote electronic device.

BACKGROUND

As electronic technology has become more advanced and has been more readily available to the common populace, computer users have become acutely aware of privacy issues surrounding use of computers and related technology. These privacy issues related, not only to traditionally confidential material (as in commercially private information or national defense information) but to personal information, such as social security numbers, credit card information, bank account numbers and data, medical information, and so forth. It is no longer difficult for a person to use another person's social security number with other personal information to obtain access to bank accounts, new or replacement credit cards a birth certificate with which other documents can be obtained, etc. Once armed with this private information, a misfeasor can inflict financial and emotional damage on an unwitting victim.

As computer networks and printers associated with them have proliferated in the workplace, one problem with protecting confidentiality can result-from an employee submitting a print job to a network printer. If the employee submits a print job to a network printer that is not in the immediate vicinity of the employee, the information will be printed by the printer and will remain on the printer for the time it takes the employee to get to the printer and retrieve the document. Since several users use a network printer, another employee or superior may be situated at the printer when the private document is printed, or shortly after the document is printed but before the first employee has arrived to retrieve the document.

Especially in the case of where the second employee is at the printer to retrieve a print job printed by that employee, it is natural that the second employee will examine, if only briefly, the private document in an attempt to determine if that document is the document that was printed by the second employee. The private document may contain personal information that the first employee would not want revealed to other employees. For example, the letter might be a letter to the first employee's lawyer about a current legal problem. Obviously, even the fact that the first employee is dealing with a lawyer may be information that the first employee does not want any other employee to know.

Another problem that arises is a case in which the employee submits the print job, but then gets distracted by a telephone call or some other diversion. It is not uncommon in such a situation for the employee to forget that the print job was sent and remains on the printer. This makes it probable that the document will be read by a fellow employee or, if personal information that may be used to 'steal' the identity of the employee, it is more vulnerable to be retrieved by a non-employee or an after-hours employee who has relatively private access to the printer.

One solution that has been used to avoid such problems is to require information, such as a private code or private password, to be entered at the printer by the employee to activate the print job. Although the print file associated with the print job is processed normally, the print file remains in the printer until the employee activates the print job. This ensures that the employee is located at the printer when the print job is printed and, thus, personally retrieves the printed document.

A problem with this solution is that it requires the printer to have a complex control panel that includes alphanumeric keys to enable a user to enter a pass code or password. This adds unnecessary expense to the printer if the printer users have no other need for entering alphanumeric information into the printer.

SUMMARY

The systems and methods for activating confidential print jobs from a remote electronic device described herein allow an owner of a print job to control the release or activation of a print job that has confidential information to be printed. The described implementations help ensure that such a printer user is proximally situated to the printer when the print job is printed.

In one implementation described herein, a network computer user selects a file to be printed on a network printer. The user indicates that the file contains confidential information so the printer will not print a document containing the information until receiving further instructions from the user. The file is downloaded to the printer and is stored in printer memory until an activation command is received from the user. The activation command from the user contains some identifying data, such as a password, that the user must enter to positively identify the user to the printer.

An alphanumeric keypad is required to enter the activation command. Rather than require a complex control panel on the printer to have an alphanumeric keypad, the activation command is entered on an alphanumeric keypad of a remote electronic device, such as a cellular telephone, a handheld computer, etc. This reduces the expense of the printer while utilizing personal electronics that are becoming increasingly common.

In another implementation, the user may designate a file to be printed directly from the electronic device. In this case, the electronic device would have the capability of connecting to a network and allowing the user to enter a file name, either directly or by scrolling through a list of choices and selecting the file to print.

Using the systems and methods described herein minimizes the risk that personal and confidential information contained in a file to be printed will be read by anyone other than the user.

BRIEF DESCRIPTION OF THE DRAWINGS

A more complete understanding of exemplary methods and arrangements of the present invention may be had by reference to the following detailed description when taken in conjunction with the accompanying drawings wherein.

DETAILED DESCRIPTION

Figure 1:
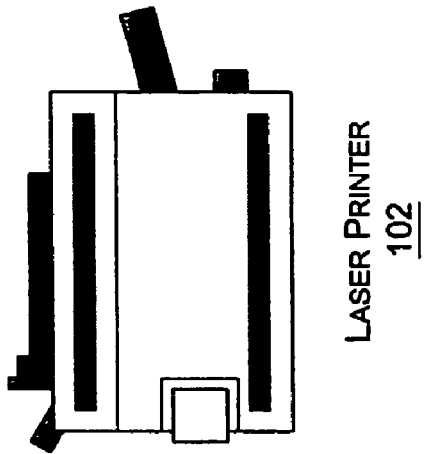
FIG. 1 is an illustration of a system having a cellular telephone communicating wirelessly with a laser printer.
Figure 1:
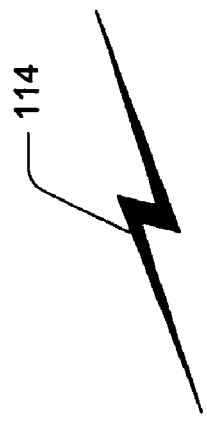
Figure 1:
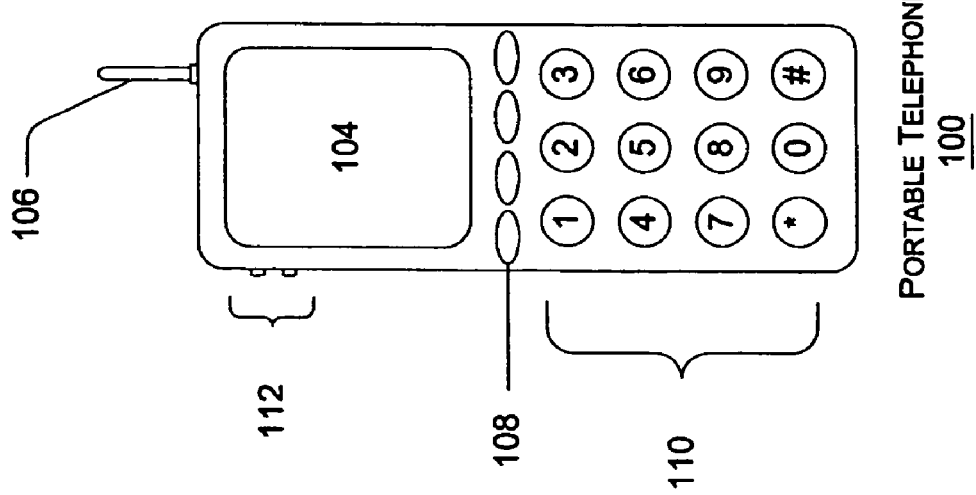

The invention is illustrated in the drawings as being implemented in a suitable computing environment. Although not required, the invention will be described in the general context of computer-executable instructions, such as program modules, to be executed by a computing device, such as a personal computer, a hand-held computer or portable electronic device. Generally, program modules include routines, programs, objects, components, data structures, etc., that perform particular tasks or implement particular abstract data types. Moreover, those skilled in the art will appreciate that the invention may be practiced with other computer system configurations, including multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

General reference is made herein to one or more printers. As used herein, "printer" means any electronic device having data communications and data storage capabilities, and functions to render printed characters on a print medium. The term "printer" includes, but is not limited to, laser printers, ink jet printers, dot matrix printers, dry medium printers, copiers, facsimile machines and plotters. Although specific examples may refer to one or more of these printers, such examples are not meant to limit the scope of the claims or the description, but are meant to provide a specific understanding of the described implementations.

FIG. 1 depicts a portable telephone 100 that communicates wirelessly with a laser printer 102. Although the described implementations refer to the portable telephone 100, it is noted that any portable, remote electronic device may be utilized to perform the functions attributed to the portable telephone 100, as long as the portable electronic device includes features configured to provide the functionality described herein. Examples of other remote electronic devices include, but are not limited to, a cellular telephone, a satellite telephone, a PDA (personal digital assistant), a handheld computer, etc.

The portable telephone 100 includes a display 104, an antenna 106 and a plurality of function buttons 108. An alphanumeric keypad 110 is included on the portable telephone 100 and is used to enter alphanumeric data into the portable telephone 100. The alphanumeric keypad 110 includes several buttons or keys. In the present example, the alphanumeric keypad 100 includes buttons similar to a standard telephone, which includes the numerals one (1) through ten (10), an asterisk button and a pound sign button. Although this configuration is not required, it is a configuration familiar to the general public and convenient for the purposes described herein.

The portable telephone 100 also includes scroll buttons 112, one button that is used to scroll up, and one button that is used to scroll down. In other implementations, a scrolling mechanism may be included, but it is unnecessary that the scrolling mechanism exist exactly as shown here. For example, if the electronic device is a PDA, then the scrolling mechanism may be scrolling buttons on the case of the PDA, or it may be a stylus and touch screen that can be used to scroll a display.

The portable telephone 100 communicates with the laser printer 102 over a wireless communications link 114. The wireless communications link may be an infrared (IR) link, a radio frequency link (RF), or any other viable wireless communications method. It is essential to the described implementations that there be a wireless link between the electronic device and the printer, so that the printer may include printers that do not have alphanumeric keys on a printer control pad as well as printer that include an alphanumeric keypad on the control panel.

Figure 2:
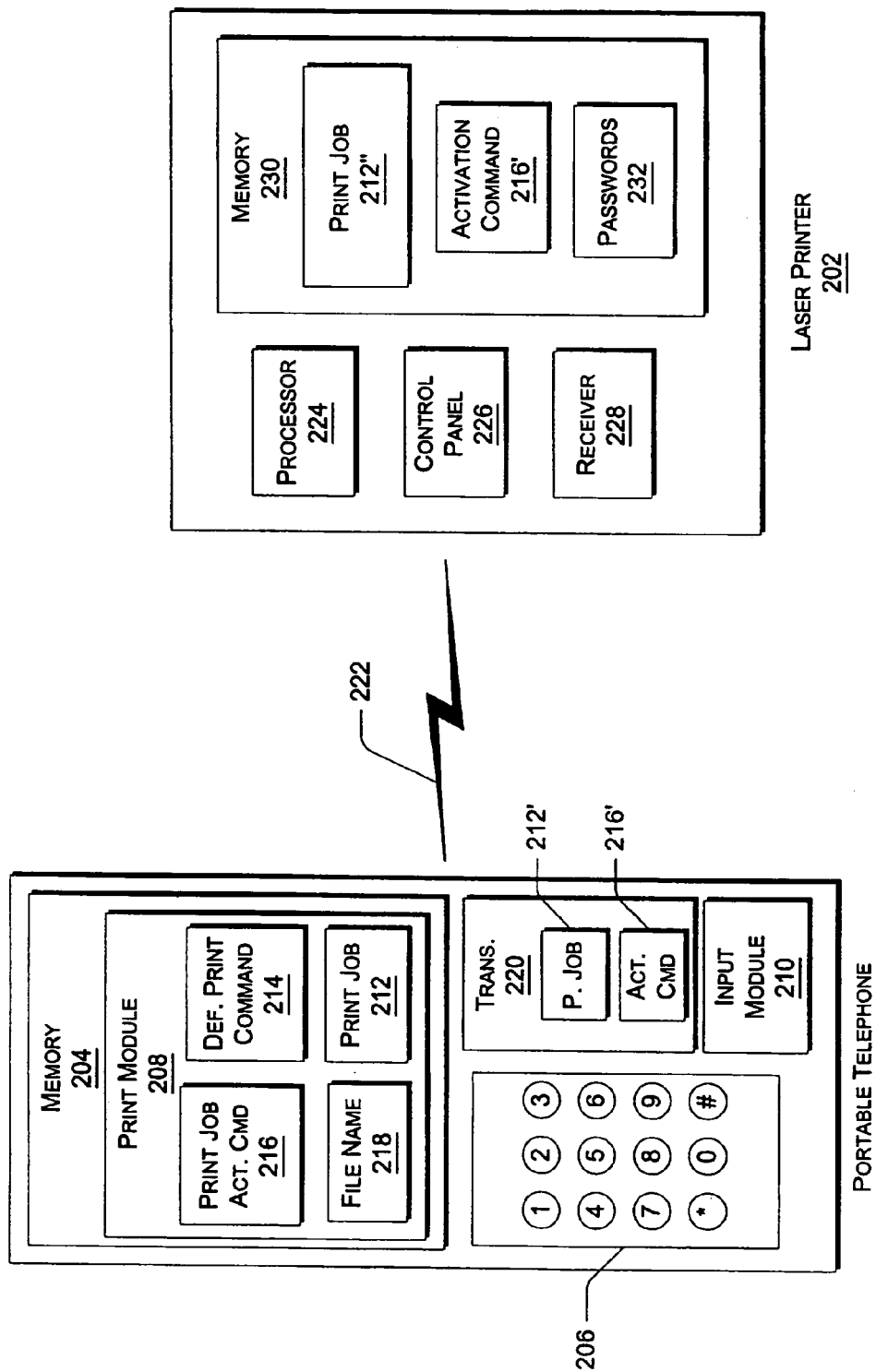
FIG. 2 is a block diagram of a system that includes a portable telephone and a printer.

FIG. 2 is a block diagram of a portable telephone 200 and the laser printer 202 similar to those shown in FIG. 1. The portable telephone 200 includes memory 204 and an alphanumeric keypad 206. The memory 204 includes a print module 208 that controls printing functions of the portable telephone 200. The portable telephone also includes an input module 210 that is configured to receive data input via the alphanumeric keypad 206 and pass input data to other components of the portable telephone 200, such as the memory 204.

The print module 208 includes a print job 212, a deferred printer command 214, a print job activation command 216 and a file name 218. The print job 212 includes the deferred print command 214 when manually included by a user or when the print job 212 contains personal and/or confidential information that has been previously identified as requiring the deferred print command 214 to be included when the print job 212 contains such information. The file name 218 is a name of a file that is to be included in the print job 212, i.e., a name of a file that is to be printed.

A transmitter 220 is also included in the portable telephone 200. The transmitter 220 transmits data via a wireless link 222 to any electronic device having a compatible wireless receiver such as, in this example, the laser printer 202. The wireless link 222 may be a radio frequency (RF) link, an infrared (IR) link, or any other practical wireless communications protocol. The transmitter 220 transmits the printer command 214' and the print job activation command 216' to the laser printer 202.

The laser printer 202 includes a processor 224, a control panel 226 and a receiver 228. The control panel 226 may or may not include an alphanumeric keypad (not shown), but it is not necessary to be able to enter alphanumeric data into the laser printer 202 via an alphanumeric keypad to comply with the described implementations.

The laser printer 202 also includes memory 230. The memory 230 includes a print job 212", which is the print job 212, 212' that is included in the portable telephone 200 prior to being transmitted to the laser printer 202. An activation command 216" is shown in the memory 230. The activation command 216" is the activation command 216' sent by the transmitter 220 of the portable telephone 200. The memory 230 also includes one or more passwords 232 that are associated with printer users that may enter activation commands to print confidential print jobs.

The features shown and described in FIG. 1 and FIG. 2 will be discussed in greater detail, below, in the discussion of a method that utilizes the portable telephone and the laser printer. Continued reference to the elements and reference numerals of FIGS. 1 and 2 will be made with reference to FIG. 3, below.

Figure 3:
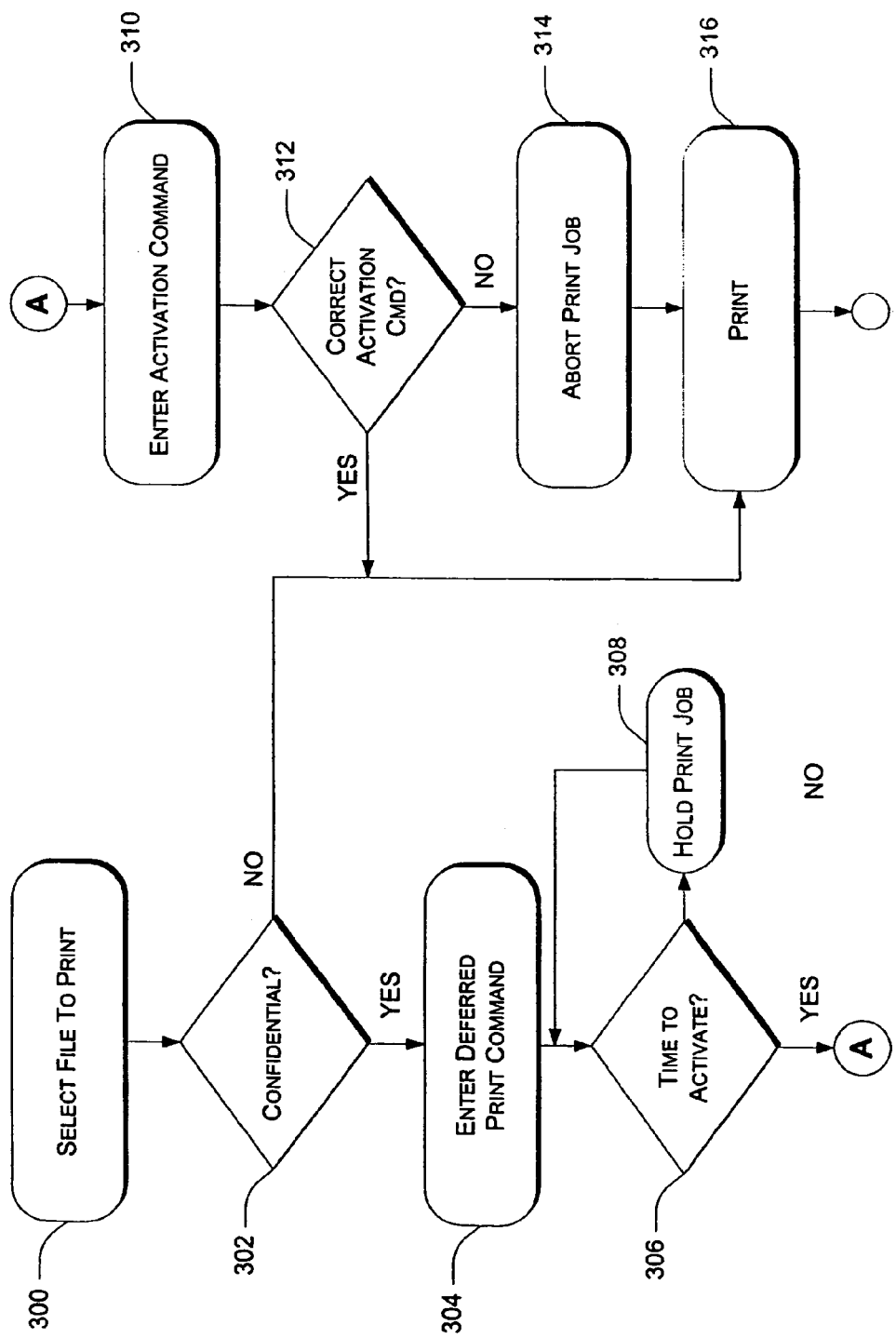
FIG. 3 is a flow diagram depicting a method for remotely activating a print job having confidential data from an electronic device.

FIG. 3 is a flow diagram outlining a method for activating confidential print jobs from a portable electronic device. At step 300, a user selects a file to print by entering the file name 218 of the file. This may be done from a network printer or from the portable electronic device. If the portable device does not have the functionality to allow the user to enter the file name 218, the device may have another way of allowing the user to specify a file to be printed, such as a file list that the user scrolls through to select the appropriate file name 218.

At step 302, the sending system—such as the portable telephone 200—determines if the file (print job 212) to be printed contains confidential or personal information that the user desires to keep private. In one implementation, the sending system has been pre-programmed to recognize certain data that, when printed, is to be treated as confidential. If the information is not private ("No" branch, step 302), the print job 212" prints on the printer at step 314. In another implementation, when the user prints information that the user does not wish others to see ("Yes" branch, step 302), the user enters a deferred print command 214 at step 304 so the print job 212" does not print until further instructions from the user.

In one implementation, a "time-to-live" value may be assigned to any deferred print job, either by the printer or by the sending system. In such a case, the print job 212" is held for the time indicated by the time-to-live value. While the time-to-live value may work to keep inactivated print jobs from building up in the printer, it is also noted that assigning a time-to-live value to a deferred print job may defeat the purpose of the present invention, if the user does not retrieve the deferred print job within the allotted time.

If the print job 212 is confidential, the print job 212" remains in the laser printer 202 until the user decides to activate the print job 212". As long as the print job 212" is not activated ("No" branch, step 306), the print job 212" is held by the laser printer 202 at step 308. If the user decides to print the print job 212", then the user enters an activation command 216 via the alphanumeric keypad 206 of the portable telephone 200 at step 310. The input module 210 receives the activation command 216 from the alphanumeric keypad 206 and stores the activation command 216 in the memory 204 of the portable telephone 200. The transmitter 220 transmits the activation command 216' to the laser printer 202 via the wireless link 222.

To insure that no other person receives the printed document having confidential information in it, the user enters the activation command 216 when the user is proximally located to the laser printer 202.

At step 312, a determination is made as to whether the activation command 216" received by the laser printer 202 is an activation command 216" that is associated with the user. The activation command 216 entered by the user is a password (or pass code) that uniquely identifies the user. To this end, the password/pass code is an alphanumeric value so that many passwords may be assigned to many users. Since the activation command 216 is entered on the portable telephone 200 or other electronic device, the control panel 226 on the laser printer 202 may be a simple control panel that does not include an alphanumeric keypad and, thus, the laser printer 202 may be more economical.

To facilitate activation command verification, the activation command 216" received by the laser printer 202 is compared to a list of passwords 232 stored in the memory 230 of the laser printer 202. If the activation command 216" matches a password stored for the user associated with the print job 212' ("Yes" branch, step 312), then the print job 212' is printed at step 316. If the activation command 216" does not match the password 232 associated with the user submitting the print job 212' ("No" branch, step 314), then the print job 212' is aborted at step 314.

In another implementation, the user may be given the opportunity to re-enter the activation command 216 if the activation command 216 entered at step 310 does not match the password 232 stored for the user associated with the print job 212'. A pre-set number of attempts may be allowed before the print job 212' is aborted at step 314.

CONCLUSION

The implementations described herein thus provide for a new way in which a user may activate a print job that is not printed automatically upon submission, such as a print job having confidential information contained therein. Portable electronic devices have become so commonplace in the workforce and in personal use, that it is efficient to transfer the control of print job activation from the printer to such devices. By doing this, a less expensive printer that has a control panel without an alphanumeric keypad may be used whereas, in the past, such activation could only be executed using an alphanumeric keypad on the control panel of the printer.

Although the implementations described herein have been described in language specific to structural features and/or methodological steps, it is to be understood that the invention defined in the appended claims is not necessarily limited to the specific features or steps described. Rather, the specific features and steps are disclosed as preferred implementations.

The invention claimed is:

1. An electronic appliance, comprising:
a plurality of alphanumeric keys;
an input module configured to receive input from one or more of the alphanumeric keys;
a print module configured to receive a deferred print command from the alphanumeric keys via the input module, and formulate a print job to send to a printer;
a transmitter configured to transmit the print job to the printer; and
wherein the print job includes an indication to the printer to hold the print job until a print job activation command is received from the electronic appliance.

2. The electronic appliance as recited in claim 1, wherein the print job activation command further comprises a password entered via the alphanumeric keys.

3. The electronic appliance as recited in claim 1, wherein the print job activation command further comprises a pass code entered via the alphanumeric keys.

4. The electronic appliance as recited in claim 1, wherein the electronic appliance comprises a personal digital assistant.

5. The electronic appliance as recited in claim 1, wherein the electronic appliance comprises a portable telephone.

6. The electronic appliance as recited in claim 1, wherein the print module is further configured to receive a network file name from the input module.

7. The electronic appliance as recited in claim 6, wherein the network file name is input into the input module via alphanumeric key entry.

8. The electronic appliance as recited in claim 6, wherein the network file name is input into the input module by scrolling through a selection list and selecting a file name from the selection list.

* * * * *